US008046293B2

(12) United States Patent  (10) Patent No.: US 8,046,293 B2
Sireau  (45) Date of Patent: *Oct. 25, 2011

(54) COMPUTER TRADING SYSTEM FOR OFFERING CUSTOM FINANCIAL MARKET SPECULATIONS

(75) Inventor: Jean-Yves Sireau, Hong Kong (HK)

(73) Assignee: Regent Markets Group Ltd., Cyberjaya, Selangor (MY)

( * ) Notice: Subject to any disclaimer, the term of this patent is extended or adjusted under 35 U.S.C. 154(b) by 955 days.

This patent is subject to a terminal disclaimer.

(21) Appl. No.: 11/734,734

(22) Filed: Apr. 12, 2007

(65) Prior Publication Data

US 2007/0288348 A1  Dec. 13, 2007

Related U.S. Application Data

(63) Continuation of application No. 09/764,778, filed on Jan. 17, 2001, now Pat. No. 7,206,762.

(30) Foreign Application Priority Data

Mar. 28, 2000 (EP) .................................... 00302530
Apr. 27, 2000 (GB) .................................. 0010270.7

(51) Int. Cl.
*G06Q 40/00* (2006.01)
(52) U.S. Cl. ........................................ 705/37; 463/26
(58) Field of Classification Search .................... 463/25; 705/37
See application file for complete search history.

(56) References Cited

U.S. PATENT DOCUMENTS

| | | | |
|---|---|---|---|
| 5,202,827 A * | 4/1993 | Sober ........................... | 705/36 R |
| 5,749,785 A * | 5/1998 | Rossides ........................ | 463/25 |
| 5,873,782 A | 2/1999 | Hall | |
| 5,971,854 A | 10/1999 | Pearson et al. | |
| 6,033,308 A | 3/2000 | Orford et al. | |
| 6,038,554 A | 3/2000 | Vig | |
| 6,061,662 A * | 5/2000 | Makivic ........................ | 705/36 R |
| 6,421,653 B1 * | 7/2002 | May ............................. | 705/36 R |

(Continued)

FOREIGN PATENT DOCUMENTS

WO  WO 98/04991  2/1998

(Continued)

OTHER PUBLICATIONS

European Search Report, dated Nov. 9, 2000 for European Application No. EP 00 30 2530, 4 pages.

(Continued)

*Primary Examiner* — Jagdish N Patel
(74) *Attorney, Agent, or Firm* — Stoel Rives LLP (57) ABSTRACT

A computer trading system for determining a calculated value for a user defined contract on a future characteristic(s) of a financial market comprises a receiving component for receiving a parameter(s) from a user defining the user defined contract and receiving financial market data concerning the financial market. The system includes a calculating component operable to determine a calculated value, such as a price, payout, or odds, for the user defined contract based on the parameter(s) and the financial market data and a transmission component for transmitting the calculated value to the user. The receiving component may also receive an order for the user defined contract from the user based on the calculated value to thereby create an obligation for a bookmaker to pay a payout amount upon the occurrence of the future characteristic(s) of the financial market satisfying the parameter(s).

157 Claims, 1 Drawing Sheet

U.S. PATENT DOCUMENTS

| | | | |
|---|---|---|---|
| 6,741,897 B1 | 5/2004 | Lallemant | |
| 6,990,467 B1 * | 1/2006 | Kwan | 705/37 |
| 7,206,762 B2 | 4/2007 | Sireau | |
| 7,315,838 B2 | 1/2008 | Gershon | |
| 7,742,972 B2 * | 6/2010 | Lange et al. | 705/37 |
| 2004/0111358 A1 * | 6/2004 | Lange et al. | 705/37 |
| 2005/0027634 A1 | 2/2005 | Gershon | |

FOREIGN PATENT DOCUMENTS

| | | |
|---|---|---|
| WO | WO 00/11587 | 3/2000 |
| WO | WO 00/13119 | 3/2000 |
| WO | WO 01/80131 A1 | 10/2001 |

OTHER PUBLICATIONS

Exbet Receives Financial Betting License, PR Newswire, Feb. 15, 2000.

European Patent Office, file history of European patent application No. 00 302 530.01-1238, Jun. 6, 2003, 57 pages.

Complaint for Patent Infringement *Regent Markets Group, Ltd.* v. *IG Markets, Inc.*, Case No. 2:10-cv-00042-TJW (E.D. Texas), filed Feb. 3, 2010, 5 pages.

Civil Docket *Regent Markets Group, Ltd.* v. *IG Markets, Inc.*, Case No. 2:10-cv-00042-TJW (E.D. Texas), transferred to N. D. Illinois (Case No. 1:11-cv-02661), printed May 20, 2011, 8 pages.

Civil Docket *Regent Markets Group, Ltd.* v. *IG Markets, Inc.*, Case No. 1:11-cv-02661 (N. D. Illinois), transferred from E.D. Texas (Case No. 2:10-cv-00042-TJW), printed May 20, 2011, 10 pages.

U.S. Patent and Trademark Office, Notice of Allowance and Fee(s) Due, Co-pending U.S. Appl. No. 11/734,724, mailed Apr. 14, 2011, 5 pages.

\* cited by examiner

FIG. 1

COMPUTER TRADING SYSTEM FOR OFFERING CUSTOM FINANCIAL MARKET SPECULATIONS

RELATED APPLICATIONS

This application is a continuation of and claims priority to U.S. application Ser. No. 09/764,778, filed Jan. 17, 2001, which in turn claims priority from European Patent Application No. 00302530.1, filed Mar. 28, 2000, and U.K. Patent Application No. 0010270.7, filed Apr. 27, 2000, all of which are hereby incorporated by reference in their entireties.

BACKGROUND

The present disclosure relates to a betting system and method for buying and selling contracts on financial markets.

Although betting in many diverse forms has been in existence for thousands of years, the concept of a bet on the future performance of one or more financial market indicators is a relatively recent one. Such a bet may take one of two forms, as will be described.

The first form of such a bet (the "spread bet") is one which, if won by the making of a correct prediction, pays out a sum proportional to the market fluctuation. For instance, a speculator may bet that a given stock will fall within a set period of time, and, if this prediction is correct, may receive winnings in direct proportion to the amount by which the stock has fallen in that period of time.

The other form that such a bet may take is known as the "digital option". Digital bets are of the same form as a traditional sporting bet in that the speculator predicts a certain event and receives either a fixed sum of winnings (if that event does occur) or no winnings (if the event does not occur). For instance, a speculator may bet that a certain stock index will rise to a certain level by a certain time. If the named index does reach this level, the speculator wins an agreed amount of money irrespective of any amount by which the index has exceeded the predicted level. It is this type of bet that is known as a "fixed odds" bet.

However, problems face the individual investor who wishes to place bets on the financial markets. The wide universe of financial instruments and derivatives products is typically available only to professional investors who have the financial resources and know-how to access these products.

Problems also face the bookmaker who wishes to offer financial bets to the private investor. These include the fact that financial bookmaking is labor-intensive, with skilled staff being required constantly to adapt the odds offered on an immense variety of possible bets to market conditions that are changing on a minute-by-minute basis.

The average size of a bet placed by an individual customer will, in general, be very small compared to the average size of a typical stock market direct investment. The potential profit to the bookmaker from such a small investment will therefore be too small for it to be economically viable to employ skilled staff to calculate the odds to offer to individual speculators sufficiently quickly.

A further problem facing bookmakers is that it is very difficult to accurately price complicated or unusual bets, and bookmakers typically offer only a few standard bets on a few markets.

A need exists for a system and method that alleviates some or all of the above problems, and which enables a bookmaker efficiently to offer a wide range of financial bets to speculators wishing to place relatively small bets.

DETAILED DESCRIPTION OF PREFERRED EMBODIMENTS

According to a first embodiment, a fixed-odds betting system comprises a user terminal operable to accept parameters, input by a user, relating to a fixed-odds bet on an aspect of a financial market; and a central processing machine having a data feed to a source of data concerning a financial market and means operable to calculate the fixed odds for the bet, based on at least some of the parameters input by the user and the data obtained from the data feed. Advantageously, the user terminal may be operable to receive and display the odds calculated by the central processing machine.

Preferably, the data feed to the source of data concerning the financial market comprises at least a data feed to real-time information concerning the financial market. Conveniently, the data feed to the source of data concerning the financial market may comprise a data feed to historical data concerning the financial market. Advantageously, the data feed is connected to the source of data concerning the financial market over a first data communications network. Preferably, the first data communications network is the Internet or a leased line. The central processing machine may have at least one other data feed to a source of data concerning one or her financial markets.

The user terminal and the central processing machine are preferably connected to one another via a second data communications network such as the Internet.

Conveniently, the system may further comprise a payment system for deducting payment for the bet from the user, the mechanism being linked to the central processing machine. The payment system for deducting payment from the user may include an E-cash or credit card payment system.

The system may further comprise an accounting system linked to the central processing machine and a management terminal operable to provide information regarding the operation of the betting system to an administrator thereof.

Advantageously, the parameters for calculating the odds may include one or more of the following: the relevant financial market(s); the amount that the user wishes to bet or the amount that the user wishes to win; and one or more barrier or target levels.

The system may further comprise a storage facility for storing information relating to bets. The central processing machine preferably includes means to retrieve information stored in the storage facility, and provide information to a user relating to a bet previously placed by the user.

Preferably, the central processing machine includes means to calculate a price at which to offer to purchase the previously placed bet from the user and to display the price calculated by the central processing machine.

In another embodiment, a method of operating a fixed-odds betting system including a central processing machine in communication with a data feed to a source of data concerning a financial market, and a user terminal in communication with the central processing machine, comprises accepting from a user parameters relating to a fixed-odds bet on an aspect of a financial market; receiving one or more of the parameters at the central processing machine; obtaining data concerning the financial market via the data feed; and the central processing machine calculating a fixed-odds price for the bet based on at least one of the parameters input by the user and the data obtained from the data feed.

The method may further comprise the steps of displaying the calculated odds to the user and deducting or receiving payment from the user for placing the bet.

Preferably, the step of receiving one or more parameters from the user includes the step of receiving information relating to one or more of the following: the relevant financial market; the amount that the user wishes to win or the amount that the user wishes to bet; and one or more barrier or target levels.

The step of obtaining data concerning the financial market may include the step of obtaining real-time data relating to one or more of the following: market prices; option quotes; interest rates and dividend yields.

The step of obtaining data concerning a financial market may include the steps of obtaining historical data relating to market prices.

Preferably, the step of calculating the fixed-odds price comprises the step of calculating an estimate of the future volatility of the financial market.

Conveniently, the method may further comprise the steps of checking the parameters input by the user for logical inconsistencies therebetween and checking the opening times of the financial market.

Preferably, the method further comprises the step of providing at least one other data feed to a source of data concerning one or more other financial markets.

Conveniently, the step of receiving parameters from the user preferably includes the step of receiving parameters relating to an aspect of the one or more other financial markets.

Advantageously, the step of calculating the fixed-odds price for the bet preferably includes the step of calculating a correlation matrix containing information concerning the financial market and the one or more other financial markets.

Preferably, the system further comprises the step of providing a storage facility, accessible by the central processing machine, for storing information relating to bets.

Conveniently, the step of calculating odds includes the step of calculating a hedging factor based on information concerning previously placed bets obtained from the storage facility. The method may further comprise the steps of: (1) calculating, at the central processing machine, a price at which to offer to buy a previously placed bet from the user; and providing the price to the user via the user terminal.

In yet another embodiment, a computer program comprises computer program code means adapted to: receive one or more parameters from a user relating to a fixed-odds bet on an aspect of a financial market; obtain data concerning a financial market via a data feed; and calculate a fixed-odds price for the bet based on at least one of the parameters input by the user and the data obtained from the data feed. The computer program may be embodied on a computer readable medium or otherwise operable on a computer.

In still another embodiment, a central processing machine having a data feed to a source of data concerning a financial market is operable to calculate fixed odds, based on parameters input by a user and data obtained from the data feed.

Conveniently, the data feed to the source of data concerning the financial market may comprise a data feed to real-time information concerning the financial market.

Advantageously, the data feed to the source of data concerning the financial market may comprise a data feed to at least historical data concerning the financial market. Preferably, the data feed is connected to the source of data concerning the financial market over a first data communications network such as the Internet or a leased line.

Advantageously, at least one other data feed may be provided to a source of data concerning one or more other financial markets.

The central processing machine may further comprise a storage facility for storing information relating to bets.

The central processing machine may also have means to calculate a price at which to offer to purchase a previously placed bet from the user.

Advantageously, the central processing machine may further comprise a management terminal operable to display information regarding the operation of the betting system to an administrator thereof.

Figure 1:
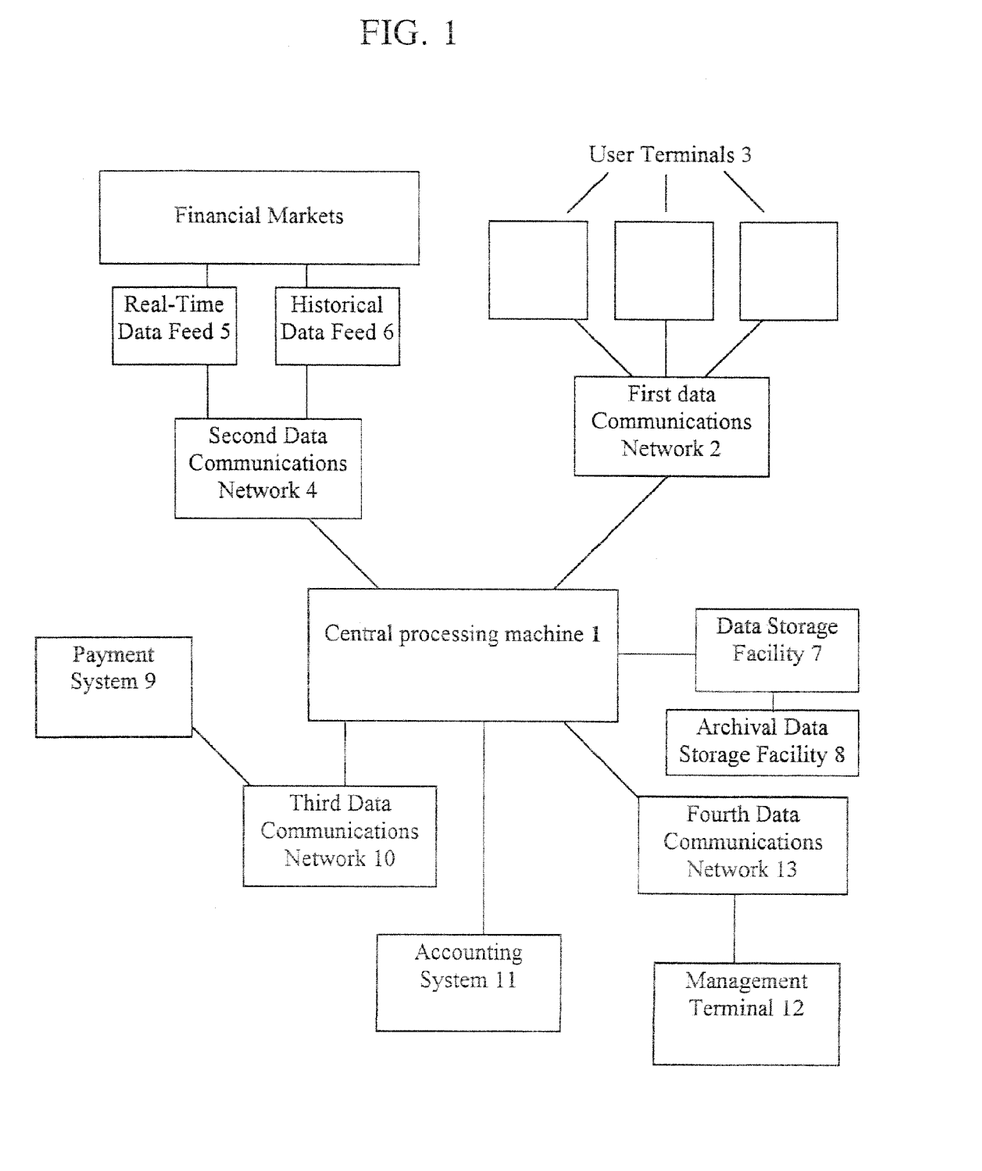
FIG. 1 shows a schematic layout of the components of a betting system in accordance with a preferred embodiment of the present invention.

With reference to FIG. 15 a central processing machine 1 of a betting system in accordance with a preferred embodiment comprises a server running a server operating system. A computer program embodying an aspect of the betting system is loaded onto the central processing machine 1, as will be described in greater detail below.

The central processing machine 1 is linked via a first data communications network 2 to a plurality of user terminals 3. Preferably, the first network 2 is the Internet. The user terminals comprise PC's, or other suitable machines, running an appropriate operating system to interface with prospective customers, for instance a Windows or UNIX type operating system.

The central processing machine 1 is further connected via a second data communications network 4 to two data feeds, one of which is a data feed 5 to a source of real-time market information, and the other of which is a data feed 6 to a source of historical market information. Preferably, the second network 4 is the Internet or a leased line. Examples of real-time market quotes data feeds are those provided by financial information providers such as Reuters, Bloomberg, Bridge, DBC, etc. The primary requirement for this data link is that it should be real-time, which is to say that the quotes retrieved via the data link are up-to-the-second real-time market quotes.

The betting system of FIG. 1 further comprises a data storage facility 7, comprising a file server operable to store information concerning placed, pending and expired bets on one or more disks. The data storage facility is connected to an archival data storage facility 8, which is operable to retain information on a plurality of tapes or other long-term storage media.

The betting system includes an E-cash or credit card payment system 9, which is linked to the central processing machine 1 by a third data communications network 10. An accounting system 11 is also included in the betting system, this accounting system being directly linked to the central processing machine 1.

A management terminal 12 also comprises part of the betting system. This management terminal 12 is linked to the central processing machine 1 via a fourth data communications network 13, which is preferably the Internet.

In operation, an individual user is able to log on to a user terminal 3 for the purpose of placing a fixed-odds financial bet. A user-id and password, provided to the individual by the administrator of the betting system, may be required to do so. In practice, the user terminal 3 may comprise a dedicated terminal in a public betting facility, or may alternatively comprise the user's own PC.

When the user attempts to log on to the betting system at the user terminal 3, the user terminal 3 connects to the central processing machine 1 via the first network 2. If a password is required, the password must be accepted by the central processing machine 1 before the user is allowed to log on to the betting system.

The user is now able to place a fixed-odds financial bet using the betting system. The user terminal 3 presents the user with a suitable interface for doing so, this interface comprising a number of menus or the like through which the user may navigate to glean information or select bet parameters. Bet parameters that the user may select may include, among others: the financial market(s) upon which the bet is to be based (for instance a foreign exchange rate); the amount that the user wishes to bet or the amount that the user wishes to win; or one or more barrier or target levels (relating to market performance) which set a threshold for the financial market parameter being monitored. Once the bet parameters are decided upon by the user, these parameters are submitted to the central processing machine 1 via the first network 2.

The first step performed by the central processing machine 1 upon receipt of the bet parameters from the user terminal 3 is to ascertain whether or not the bet defined by the bet parameters is within reasonable reach of current market prices. In order to decide whether or not this is the case, the central processing machine 1 gathers information concerning the current market prices from the data feed 5 to the source of real-time market information. If the data derived therefrom indicates that there is no realistic possibility of the market price changing with the rapidity required by the bet, then the central processing machine 1 will reject the bet.

Next, the bet parameters input by the user are checked by the central processing machine 1 for logical inconsistencies, and the bet is rejected if such inconsistencies are found to be present. For instance, if a user has input bet parameters defining a bet that a certain financial index will remain between a high value of 110 and a low value of 120, the central processing machine 1 will determine that the bet is logically inconsistent and reject the bet.

A further step performed by the central processing machine 1 on receipt of a set of bet parameters from user terminal 3 is to check the opening times of the relevant financial markets. The central processing machine 1 has, for this purpose, a link to a source of information containing the opening hours and public holidays of all of the markets upon which bets are offered. If a user is allowed to bet upon the performance of a market during a period for which that market is closed, the user gains an unfair advantage and thus such a bet would be rejected.

Once it has been established by the central processing machine 1 that the bet parameters input by the user define a valid bet, the next step is to determine the real-time raw market values from which to calculate the price of the bet. In order to do this, the central processing machine 1 accesses the data feed 5 to the source of real-time market information. The data derived therefrom may include current market prices, option quotes, interest rate levels, dividend yields (in the case of stocks or stock indices), or carrying costs (i.e., storage, delivery or insurance costs, in the case of commodities). The central processing machine 1 may also access the data feed 6 to the source of historical market information, and the data gathered therefrom may include historical closing prices for the relevant markets.

Once a set of valid bet parameters have been received by the central processing machine 1 and the relevant information has been gathered from the data feeds 5, 6, the central processing machine 1 uses the information to calculate the odds that will be offered to the user for the bet.

The first step in the process is to calculate the implied volatility of each market upon which the bet is based. The volatility of a market is defined as the amount by which the market fluctuates during a given period, and is often defined as the annualized standard deviation of the natural logarithm of the price returns of the daily closing values of the market.

The implied volatility is the market volatility that the listed options market implies for the future, market volatility being a major factor in the determination of the price of an option. If the price of the listed options relating to a given market for a given time period is known, this figure can be reverse-engineered to calculate the future volatility of the market implied by that option price. Various techniques exist for this reverse engineering operation, the most commonly used of which is an algorithm based on the Black and Scholes option pricing model, however the skilled person will realize that any of several alternative algorithms may be used instead.

A standard option pricing model such as the Black and Scholes model assumes that the financial markets follow a log-normal distribution. This assumption does not, however, accurately reflect the market panics (like the 1987 stock market crash), which occur with a higher frequency than would be expected in a purely lognormal distribution. To adjust for the "fatter tails" of the real distribution of market returns, the concept of "volatility smile" is introduced, whereby options with different strike prices trade at different implied volatilities. Options with different expiry dates also trade at different implied volatilities, reflecting different expectations of market volatility over different time periods. Since there will likely not be any option with exactly the same expiry date and target price as the bet, interpolation will be used to arrive at the best estimate of the volatility for the bet.

To calculate the volatility to be used to price the bet, options prices are gathered from the data feed 5 to the real-time source of market information. The implied volatilities of the options with strike prices closest to the barrier or target level of the bet, and with expiry dates closest to the expiry date of the bet, are computed. These implied volatility points are then interpolated to arrive at the implied volatility most appropriate for the expiry date and barrier or target level of the bet (if the bet has several barrier or target levels, the level that will lead to the highest selling price for the bet may be used). This interpolated implied volatility is used by the central processing machine 1 to calculate the odds for the bet.

It is also necessary for the central processing machine 1 to take into account the growth of the market or markets in question. In order to derive this value, the interest rate and other components of the carrying cost for each market (extracted from the data feed 5 to the real-time source of market information) are required. For stocks or stock indices, the growth of the market is typically approximated as being the interest rate minus the annualized dividend yield. In a similar manner to that described above, the interest rate for an arbitrary time period may be estimated by interpolating between the deposit rates for earlier and later maturities to arrive at an appropriate value. For foreign exchange rates, the growth rate is defined as the difference between the deposit rates in each currency, and for other markets such as commodities, the growth rate incorporates factors such as storage or delivery costs, and insurance fees.

A complex bet may involve predictions on the performances of several different markets, and if such a bet is placed then a correlation matrix for these different markets will need to be computed. Such a correlation matrix is computed by calculating the correlation coefficients of the relevant markets over a period of historical data obtained from the data feed 6 to the source of historical market information. Ideally, this time period is in proportion to the length of the bet.

Once all of the necessary information has been gathered or computed by the central processing machine 1, the central processing machine 1 proceeds to calculate the odds for the bet defined by the bet parameters. There are various ways in which this may be performed for each type of bet that might be placed by the user. Common bets that might be placed include:

an "up/down" bet that a given market will be above or below a given level on a given date;

an "expiry range" bet that a given market will be between two given levels on a given date;

a "rainbow" bet, which is essentially a multi-market expiry range bet;

a "bullseye" bet that a given market will have an exactly given value on a given date;

a "one-touch" bet that a given market will touch a given barrier level at some point before the expiry of the bet;

a "no-touch" bet that a given market will not touch a given barrier level at any point before the expiry of the bet;

a "range" bet that a given market will touch neither of two given barrier levels at any point before the expiry of the bet;

a "double one-touch" bet that a given market will touch both of two given barrier levels at some point before the expiry of the bet;

a "win", "place" or "show" bet that a market will be respectively the best, or within the top two best, or top three best, performing markets (in percentage terms) over a given period; and a "quinella", "tierce" or "exacta" bet defined from their racetrack equivalents.

An example of how the price of an expiry range bet might be calculated is as follows:

The formula for the underlying asset price S is given by:

$$dS = mSdt + sSdz$$

where m is the growth rate, s is the volatility, t is time and z is a variable that follows a Wiener process. The variable z can be understood by considering the changes in the value thereof over small intervals of time. Consider a small interval of time having a duration of dt and define dz as the change in z during dt. There are two basic properties that dz must have for z to be following a Wiener process:

dz must be related to dt by the equation:

$$\Delta z = \epsilon \sqrt{\Delta t}$$

where $\epsilon$ is a random drawing from a standardized normal distribution (i.e., a normal distribution with a mean of zero and a standard deviation of 1.0), and the values of dz, for any two different short intervals of time dt, must be independent.

Solving this equation, we obtain:

$$S(t) = S \exp((m - s^2/2)t + sz(t))$$

where S(t) is the asset price at time t and S is the initial asset price.

Let $\rho$ be the probability of success of a bet in this model at expiry time t. The present value of this bet thus becomes:

$$P = \exp(-rt)\rho$$

where P is the present value (or fair price) of the bet, r is the interest rate, and t is the time to maturity. We denote:

$$X_t = \log(S(t)/S)$$

and $$v = r - g - \frac{\sigma^2}{2}$$

where S(t) is the asset price at time t, t is the time to maturity, S is the initial asset price, r is the interest rate, g is the dividend rate and s is the volatility.

Then, the variable x is defined as $$x = \frac{X_\tau - v\tau}{\sigma\sqrt{\tau}}$$

and is normally distributed with probability density:

$$f(x) = \frac{1}{\sqrt{2\pi}} \exp\left(-\frac{x^2}{2}\right)$$

Now, we denote:

$$f(y) = \frac{1}{\sqrt{2\pi}} \exp\left(-\frac{y^2}{2}\right)$$

and $$N(x) = \int_{-\infty}^{x} f(y) dy$$

where N(x) is the cumulative probability of the normal distribution. Let S be al market price, and let $$a = \log\left(\frac{U}{S}\right) \text{ and } b = \log\left(\frac{D}{S}\right)$$

where U and D are the up and down barriers of the bet respectively. The price of the expiry range bet, defined by U and D, is then given by:

$$P = e^{-rt}\left[N\left(\frac{a - v\tau}{\sigma\sqrt{(\tau)}}\right) - N\left(\frac{b - v\tau}{\sigma\sqrt{(\tau)}}\right)\right].$$

Other formulae for different types of bets may readily be derived by employing the same principles. The type of formula employed is also not essential to the working of the system—many different methods of calculating odds exist, and any of these may be used in the system.

Once the price of the bet defined by the bet parameters input by the user is determined, a house mark-up is added and the bet is offered to the user via the user terminal 3. Since the system operates on real-time values derived from the constantly fluctuating markets, the customer is allowed only a short time in which to decide whether or not to purchase the bet at the calculated price. This time period is, preferably, no more than thirty to sixty seconds, and the offer is withdrawn after this time.

If the user decides to purchase the bet, he or she will be prompted to input a username and password (if these were not input at an earlier stage). This information is verified by the central processing machine 1 and, if it is accepted, will check the credit balance of the user on the accounting system 11. If this reveals that the user has sufficient funds to purchase the bet, the transaction with the user is effected and the bet is recorded on the data storage facility 7.

Each user of the system may, on entering his or her valid username and password, view a list of outstanding bets that he or she has placed on a user terminal 3. In order to provide this list, the central processing machine 1 retrieves information regarding the user's previously placed bets from the data storage facility 7. The central processing machine 1 must, for each previously placed bet, determine whether the bet has: already expired or fulfilled the conditions of the bet so that the user has won the bet; already expired or contravened the conditions of the bet so that the user has lost the bet; or has not yet reached the date or conditions of expiry. The central processing machine 1 derives this information by comparing the bet parameters with both real-time market information and historical market information for the relevant time period obtained via the data feeds 5, 6. The status of each previously placed bet is passed to the user terminal 3 for display to the user. If the user has won any of the bets, the central processing machine 1 instructs the accounting system 11 to credit the user's account accordingly.

The system may also be provided with a facility to offer to buy an unexpired bet back from the user. The price that is offered for a bet is calculated by first determining the value of the bet using similar techniques to those described above, with a house mark-up being included in the price. As described above, the user is given no more than thirty to sixty seconds to decide whether or not to accept the price offered before the offer is withdrawn.

All of the transactions between the central processing machine 1 and the users of the system may be monitored by an administrator of the system at the management terminal 12. This facility allows the administrator to ensure that the system is running smoothly and that the algorithms and/or models employed by the central processing machine 1 are producing appropriate results.

As a further consideration, the administrator of the system may be concerned about his or her financial exposure and the system may accordingly include means to inform the administrator, in real-time, of the financial exposure via the management terminal 12. This facility allows the administrator to "hedge" in the futures and options markets. There are four types of hedging ratio commonly used, namely the delta, theta, gamma and vega hedging ratios. These ratios, along with the appropriate hedging techniques, are well known in the art.

In an alternative embodiment, the E-cash or credit card payment system 9 is replaced by a system that operates with "virtual" or "fantasy" money instead of real funds. In such an embodiment, bettors are allocated an initial amount of "fantasy" money to purchase bets. Successful bettors have the chance to win prizes or other benefits.

As a further consideration, whether or not the payment system comprises real or "fantasy" money, the administrator of the system may wish to track the bettors who are consistently successful at forecasting the direction of the financial markets. The administrator knows that under the assumption of efficient markets, no person may consistently forecast the financial markets, and therefore successful bettors are simply those that have been successful by chance. However, tracking successful bettors may provide useful information for the administrator, such as useful clues for tracking down problems with this embodiment. The administrator may also sell or provide the information comprised of the ongoing bets of the successful bettors, to third parties who may choose to use or rely upon this information on the belief that the successful bettors have a special gift rather than being simply lucky.

The betting system for calculating the fixed-price odds that may be offered to a prospective bettor is particularly well-suited to bets placed on the financial markets since the calculation of fixed-price odds is sufficiently difficult, time consuming and computationally intensive to make calculation thereof by humans inefficient for all but the largest of bets. The system described herein allows an administrator of the system to offer reasonable and well-calculated odds in real-time to individual speculators betting small sums of money on an almost unlimited number of eventualities, without the need to employ highly-skilled staff to do so. This service has not been available in the past.

It will be obvious to those having skill in the art that many changes may be made to the details of the above-described embodiments without departing from the underlying principles thereof. The scope of the present invention should, therefore, be determined only by the following claims.

The invention claimed is:

1. A computer trading system for determining a calculated value for a user defined contract on at least one future characteristic of a financial market, comprising:
   a first receiving component for receiving one or more parameters from a user over a first communication network, the one or more parameters defining a user defined contract on the at least one future characteristic of the financial market;
   a second receiving component for receiving financial market data concerning the financial market over a second communication network;
   a calculating component in communication with the first and second receiving components and operable to determine a calculated value for the user defined contract that will be offered to the user so that the user can purchase the user defined contract at the calculated value, the calculated value determined based on the one or more parameters and the financial market data;
   a transmission component in communication with the calculating component for transmitting the calculated value to the user via the first communication network; and
   a third receiving component in communication with the calculating component for receiving over the first communication network an order for the user defined contract from the user based on the calculated value and the one or more parameters to thereby form the user defined contract and create an obligation for a bookmaker to pay a payout upon the occurrence of the at least one future characteristic of the financial market satisfying the one or more parameters.

2. The computer trading system of claim 1 wherein the first, second, and third receiving components comprise a network interface device.

3. The computer trading system of claim 1 wherein the first and second communication networks are a common network.

4. The computer trading system of claim 1 wherein the transmission component presents an indication to the user that the payout will be made to the user based on the at least one future characteristic of the financial market satisfying the one or more parameters.

5. The computer trading system of claim 1 wherein the payout includes a fixed payout amount.

6. The computer trading system of claim 1 wherein the calculated value for the user defined contract includes a price for the user defined contract.

7. The computer trading system of claim 1 wherein the calculated value for the user defined contract includes odds that the at least one future characteristic of the financial market will satisfy the one or more parameters.

8. The computer trading system of claim 1 wherein the calculated value for the user defined contract includes a payout amount of the payout for the user defined contract.

9. The computer trading system of claim 1 wherein the calculated value reflects an implied volatility of the financial market.

10. The computer trading system of claim 1 wherein the user defined contract must be purchased within a period of time.

11. The computer trading system of claim 1 wherein the one or more parameters includes a desired payout amount of the payout.

12. The computer trading system of claim 1 wherein the one or more parameters includes a target for the at least one future characteristic of the financial market.

13. The computer trading system of claim 1 wherein the one or more parameters includes a barrier for the at least one future characteristic of the financial market.

14. The computer trading system of claim 1 wherein the financial market includes a foreign currency market and the one or more parameters includes a currency exchange rate.

15. The computer trading system of claim 1 wherein the financial market includes a stock market and the one or more parameters includes a stock price.

16. The computer trading system of claim 1 wherein the financial market includes a stock market index and the one or more parameters includes a stock market index price.

17. The computer trading system of claim 1 wherein the financial market includes a commodity market and the one or more parameters includes a commodity price.

18. The computer trading system of claim 1 wherein the financial market includes a foreign currency market and the at least one future characteristic of the financial market includes a change in a foreign currency exchange rate.

19. The computer trading system of claim 1 wherein the financial market includes a stock market and the at least one future characteristic of the financial market includes a change in a stock price.

20. The computer trading system of claim 1 wherein the financial market includes a stock market index and the at least one future characteristic of the financial market includes a change in a stock market index price.

21. The computer trading system of claim 1 wherein the financial market includes a commodity market and the at least one future characteristic of the financial market includes a change in a commodity price.

22. The computer trading system of claim 1 wherein the one or more parameters includes a first financial market and a second financial market and the at least one future characteristic of the first financial market includes a first target for the first financial market and the at least one future characteristic of the second financial market includes a second target for the second financial market.

23. The computer trading system of claim 1 wherein the data concerning the financial market includes real-time market data.

24. The computer trading system of claim 1 wherein the data concerning the financial market includes historical market data.

25. A computer trading system for determining a calculated value for a user defined contract on at least one future characteristic of a financial market, comprising:
a network interface; and
a processor in communication with the network interface, the processor operable to:
receive via the network interface one or more parameters from a user, the one or more parameters defining a user defined contract on the at least one future characteristic of the financial market;
receive via the network interface financial market data concerning the financial market;
calculate a value for the user defined contract that will be offered to the user so that the user can purchase the user defined contract at the value, the value calculated based on the one or more parameters and the financial market data;
transmit via the network interface the calculated value to the user; and
receive via the network interface an order for the user defined contract from the user based on the calculated value and the one or more parameters to thereby form the user defined contract and create an obligation for a bookmaker to pay a payout upon the occurrence of the at least one future characteristic of the financial market satisfying the one or more parameters.

26. The computer trading system of claim 25 wherein the network interface presents an indication to the user that the payout will be made to the user based on the at least one future characteristic of the financial market satisfying the one or more parameters.

27. The computer trading system of claim 25 wherein the payout includes a fixed payout amount.

28. The computer trading system of claim 25 wherein the calculated value for the user defined contract includes a price for the user defined contract.

29. The computer trading system of claim 25 wherein the calculated value for the user defined contract includes odds that the at least one future characteristic of the financial market will satisfy the one or more parameters.

30. The computer trading system of claim 25 wherein the calculated value for the user defined contract includes a payout amount of the payout for the user defined contract.

31. The computer trading system of claim 25 wherein the calculated value reflects an implied volatility of the financial market.

32. The computer trading system of claim 25 wherein the user defined contract must be purchased within a period of time.

33. The computer trading system of claim 25 wherein the one or more parameters includes a desired payout amount of the payout.

34. The computer trading system of claim 25 wherein the one or more parameters includes a target for the at least one future characteristic of the financial market.

35. The computer trading system of claim 25 wherein the one or more parameters includes a barrier for the at least one future characteristic of the financial market.

36. The computer trading system of claim 25 wherein the financial market includes a foreign currency market and the one or more parameters includes a currency exchange rate.

37. The computer trading system of claim 25 wherein the financial market includes a stock market and the one or more parameters includes a stock price.

38. The computer trading system of claim 25 wherein the financial market includes a stock market index and the one or more parameters includes a stock market index price.

39. The computer trading system of claim 25 wherein the financial market includes a commodity market and the one or more parameters includes a commodity price.

40. The computer trading system of claim 25 wherein the financial market includes a foreign currency market and the at least one future characteristic of the financial market includes a change in a foreign currency exchange rate.

41. The computer trading system of claim 25 wherein the financial market includes a stock market and the at least one future characteristic of the financial market includes a change in a stock price.

42. The computer trading system of claim 25 wherein the financial market includes a stock market index and the at least one future characteristic of the financial market includes a change in a stock market index price.

43. The computer trading system of claim 25 wherein the financial market includes a commodity market and the at least one future characteristic of the financial market includes a change in a commodity price.

44. The computer trading system of claim 25 wherein the one or more parameters includes a first financial market and a second financial market and the at least one future characteristic of the first financial market includes a first target for the first financial market and the at least one future characteristic of the second financial market includes a second target for the second financial market.

45. The computer trading system of claim 25 wherein the data concerning the financial market includes real-time market data.

46. The computer trading system of claim 25 wherein the data concerning the financial market includes historical market data.

47. A method for a customer to place an order with a bookmaker for a customer defined contract on at least one future characteristic of a financial market, comprising:
    obtaining one or more parameters from the customer via a customer terminal, the one or more parameters defining a customer defined contract on the at least one future characteristic of the financial market;
    determining a calculated value for the customer defined contract that will be offered to the customer so that the customer can purchase the customer defined contract at the calculated value, the calculated value determined by a central processing machine based on the one or more parameters and financial market data concerning the financial market; and
    placing the order for the customer defined contract in response to receiving from the customer terminal a request from the customer based on the calculated value and the one or more parameters to thereby form the customer defined contract and create an obligation for the bookmaker to pay a payout upon the occurrence of the at least one future characteristic of the financial market satisfying the one or more parameters.

48. The method of claim 47 wherein the payout includes a fixed payout amount.

49. The method of claim 47 wherein the calculated value for the customer defined contract includes a price for the customer defined contract.

50. The method of claim 47 wherein the calculated value for the customer defined contract includes odds that the at least one future characteristic of the financial market will satisfy the one or more parameters.

51. The method of claim 47 wherein the calculated value for the customer defined contract includes a payout amount of the payout for the customer defined contract.

52. The method of claim 47 wherein the calculated value reflects an implied volatility of the financial market.

53. The method of claim 47 further comprising:
    presenting an indication to the customer that the payout will be made to the customer based on the at least one future characteristic of the financial market satisfying the one or more parameters.

54. The method of claim 47 wherein the customer defined contract must be purchased within a period of time.

55. The method of claim 47 wherein the one or more parameters includes a desired payout amount of the payout.

56. The method of claim 47 wherein the one or more parameters includes a target for the at least one future characteristic of the financial market.

57. The method of claim 47 wherein the one or more parameters includes a barrier for the at least one future characteristic of the financial market.

58. The method of claim 47 wherein the financial market includes a foreign currency market and the one or more parameters includes a currency exchange rate.

59. The method of claim 47 wherein the financial market includes a stock market and the one or more parameters includes a stock price.

60. The method of claim 47 wherein the financial market includes a stock market index and the one or more parameters includes a stock market index price.

61. The method of claim 47 wherein the financial market includes a commodity market and the one or more parameters includes a commodity price.

62. The method of claim 47 wherein the financial market includes a foreign currency market and the at least one future characteristic of the financial market includes a change in a foreign currency exchange rate.

63. The method of claim 47 wherein the financial market includes a stock market and the at least one future characteristic of the financial market includes a change in a stock price.

64. The method of claim 47 wherein the financial market includes a stock market index and the at least one future characteristic of the financial market includes a change in a stock market index price.

65. The method of claim 47 wherein the financial market includes a commodity market and the at least one future characteristic of the financial market includes a change in a commodity price.

66. The method of claim 47 wherein the one or more parameters includes a first financial market and a second financial market and the at least one future characteristic of the first financial market includes a first target for the first financial market and the at least one future characteristic of the second financial market includes a second target for the second financial market.

67. The method of claim 47 wherein the data concerning the financial market includes real-time market data.

68. The method of claim 47 wherein the data concerning the financial market includes historical market data.

69. A method for facilitating speculation on at least one future characteristic of a financial market, comprising:
    receiving from a user terminal via a network one or more parameters for a proposed contract on at least one future characteristic of a financial market;
    transmitting to the user terminal via the network an indication of a value for the proposed contract, the value determined based on the one or more parameters and data concerning the financial market; and receiving from the user terminal via the network an order for the proposed contract, the order based on the value transmitted to the user terminal and the one or more parameters, thereby facilitating speculation on the financial market by allowing a user to define the proposed contract and order the proposed contract based on the value transmitted to the user terminal and the one or more parameters so that a contract is formed after the order is received and the user is eligible to receive a payout upon the occurrence of the at least one future characteristic of the financial market satisfying the one or more parameters.

70. The method of claim 69 wherein the payout includes a fixed payout amount.

71. The method of claim 69 wherein the value for the proposed contract includes a price for the proposed contract.

72. The method of claim 69 wherein the value for the proposed contract includes odds that the at least one future characteristic of the financial market will satisfy the one or more parameters.

73. The method of claim 69 wherein the value for the proposed contract includes a payout amount of the payout for the proposed contract.

74. The method of claim 69 wherein the value reflects an implied volatility of the financial market.

75. The method of claim 69 further comprising:
presenting an indication to the user that the payout will be made to the user based on the at least one future characteristic of the financial market satisfying the one or more parameters.

76. The method of claim 69 wherein the order for the proposed contract must be placed within a period of time.

77. The method of claim 69 wherein the one or more parameters includes a desired payout amount of the payout.

78. The method of claim 69 wherein the one or more parameters includes a target for the at least one future characteristic of the financial market.

79. The method of claim 69 wherein the one or more parameters includes a barrier for the at least one future characteristic of the financial market.

80. The method of claim 69 wherein the financial market includes a foreign currency market and the one or more parameters includes a currency exchange rate.

81. The method of claim 69 wherein the financial market includes a stock market and the one or more parameters includes a stock price.

82. The method of claim 69 wherein the financial market includes a stock market index and the one or more parameters includes a stock market index price.

83. The method of claim 69 wherein the financial market includes a commodity market and the one or more parameters includes a commodity price.

84. The method of claim 69 wherein the financial market includes a foreign currency market and the at least one future characteristic of the financial market includes a change in a foreign currency exchange rate.

85. The method of claim 69 wherein the financial market includes a stock market and the at least one future characteristic of the financial market includes a change in a stock price.

86. The method of claim 69 wherein the financial market includes a stock market index and the at least one future characteristic of the financial market includes a change in a stock market index price.

87. The method of claim 69 wherein the financial market includes a commodity market and the at least one future characteristic of the financial market includes a change in a commodity price.

88. The method of claim 69 wherein the one or more parameters includes a first financial market and a second financial market and the at least one future characteristic of the first financial market includes a first target for the first financial market and the at least one future characteristic of the second financial market includes a second target for the second financial market.

89. The method of claim 69 wherein the data concerning the financial market includes real-time market data.

90. The method of claim 69 wherein the data concerning the financial market includes historical market data.

91. A system for facilitating speculation on at least one future characteristic of a financial market, comprising:
a network interface; and
a processor in communication with the network interface, the processor configured to:
receive from a user terminal via the network interface one or more parameters for a proposed contract on at least one future characteristic of a financial market;
transmit to the user terminal via the network interface an indication of a value for the proposed contract, the value determined based on the one or more parameters and data concerning the financial market; and
receive from the user terminal via the network interface an order for the proposed contract, the order based on the value transmitted to the user terminal and the one or more parameters,
thereby facilitating speculation on the financial market by allowing a user to define the proposed contract and order the proposed contract based on the value transmitted to the user terminal and the one or more parameters so that a contract is formed after the order is received and the user is eligible to receive a payout upon the occurrence of the at least one future characteristic of the financial market satisfying the one or more parameters.

92. The system of claim 91 wherein the network interface presents an indication to the user that the payout will be made to the user based on the at least one future characteristic of the financial market satisfying the one or more parameters.

93. The system of claim 91 wherein the payout includes a fixed payout amount.

94. The system of claim 91 wherein the value for the proposed contract includes a price for the proposed contract.

95. The system of claim 91 wherein the value for the proposed contract includes odds that the at least one future characteristic of the financial market will satisfy the one or more parameters.

96. The system of claim 91 wherein the value for the proposed contract includes a payout amount of the payout for the proposed contract.

97. The system of claim 91 wherein the value reflects an implied volatility of the financial market.

98. The system of claim 91 wherein the order for the proposed contract must be placed within a period of time.

99. The system of claim 91 wherein the one or more parameters includes a desired payout amount of the payout.

100. The system of claim 91 wherein the one or more parameters includes a target for the at least one future characteristic of the financial market.

101. The system of claim 91 wherein the one or more parameters includes a barrier for the at least one future characteristic of the financial market.

102. The system of claim 91 wherein the financial market includes a foreign currency market and the one or more parameters includes a currency exchange rate.

103. The system of claim 91 wherein the financial market includes a stock market and the one or more parameters includes a stock price.

104. The system of claim 91 wherein the financial market includes a stock market index and the one or more parameters includes a stock market index price.

105. The system of claim 91 wherein the financial market includes a commodity market and the one or more parameters includes a commodity price.

106. The system of claim 91 wherein the financial market includes a foreign currency market and the at least one future characteristic of the financial market includes a change in a foreign currency exchange rate.

107. The system of claim 91 wherein the financial market includes a stock market and the at least one future characteristic of the financial market includes a change in a stock price.

108. The system of claim 91 wherein the financial market includes a stock market index and the at least one future characteristic of the financial market includes a change in a stock market index price.

109. The system of claim 91 wherein the financial market includes a commodity market and the at least one future characteristic of the financial market includes a change in a commodity price.

110. The system of claim 91 wherein the one or more parameters includes a first financial market and a second financial market and the at least one future characteristic of the first financial market includes a first target for the first financial market and the at least one future characteristic of the second financial market includes a second target for the second financial market.

111. The system of claim 91 wherein the data concerning the financial market includes real-time market data.

112. The system of claim 91 wherein the data concerning the financial market includes historical market data.

113. A method for facilitating speculation on at least one future characteristic of a financial market, comprising:
obtaining one or more parameters that define a contract on at least one future characteristic of a financial market;
obtaining from a data feed via a network interface financial market data concerning the financial market;
calculating, by a processor, a value for the contract based on the one or more parameters and the financial market data concerning the financial market; and
communicating the value to a computer in communication with a user so that the user can purchase the contract based on the value and the one or more parameters to thereby facilitate speculation on the financial market.

114. The method of claim 113 wherein the step of obtaining one or more parameters comprises receiving the one or more parameters from the user via a network.

115. The method of claim 113 further comprising:
presenting an indication to the user that a payout will be made to the user based on the at least one future characteristic of the financial market satisfying the one or more parameters.

116. The method of claim 115 wherein the payout includes a fixed payout amount.

117. The method of claim 113 wherein the value for the contract includes a price for the contract.

118. The method of claim 113 wherein the value for the contract includes odds that the at least one future characteristic of the financial market will satisfy the one or more parameters.

119. The method of claim 113 wherein the value for the contract includes a payout for the contract.

120. The method of claim 113 wherein the value reflects an implied volatility of the financial market.

121. The method of claim 113 wherein the contract must be purchased within a period of time.

122. The method of claim 113 wherein the one or more parameters includes a desired payout amount.

123. The method of claim 113 wherein the one or more parameters includes a target for the at least one future characteristic of the financial market.

124. The method of claim 113 wherein the one or more parameters includes a barrier for the at least one future characteristic of the financial market.

125. The method of claim 113 wherein the financial market includes a foreign currency market and the one or more parameters includes a currency exchange rate.

126. The method of claim 113 wherein the financial market includes a stock market and the one or more parameters includes a stock price.

127. The method of claim 113 wherein the financial market includes a stock market index and the one or more parameters includes a stock market index price.

128. The method of claim 113 wherein the financial market includes a commodity market and the one or more parameters includes a commodity price.

129. The method of claim 113 wherein the financial market includes a foreign currency market and the at least one future characteristic of the financial market includes a change in a foreign currency exchange rate.

130. The method of claim 113 wherein the financial market includes a stock market and the at least one future characteristic of the financial market includes a change in a stock price.

131. The method of claim 113 wherein the financial market includes a stock market index and the at least one future characteristic of the financial market includes a change in a stock market index price.

132. The method of claim 113 wherein the financial market includes a commodity market and the at least one future characteristic of the financial market includes a change in a commodity price.

133. The method of claim 113 wherein the one or more parameters includes a first financial market and a second financial market and the at least one future characteristic of the first financial market includes a first target for the first financial market and the at least one future characteristic of the second financial market includes a second target for the second financial market.

134. The method of claim 113 wherein the data concerning the financial market includes real-time market data.

135. The method of claim 113 wherein the data concerning the financial market includes historical market data.

136. A system for facilitating speculation on at least one future characteristic of a financial market, comprising:
a network interface; and
a processor in communication with the network interface, the processor configured to:
obtain one or more parameters that define a contract on at least one future characteristic of a financial market;
obtain financial market data concerning the financial market from a data feed via the network interface;
calculate a value for the contract based on the one or more parameters and the financial market data concerning the financial market; and
communicate, via the network interface, the value to a computer in communication with a user so that the user can purchase the contract based on the value and the one or more parameters to thereby facilitate speculation on the financial market.

137. The system of claim 136 wherein the network interface presents an indication to the user that a payout will he made to the user based on the at least one future characteristic of the financial market satisfying the one or more parameters.

138. The system of claim 137 wherein the payout includes a fixed payout amount.

139. The system of claim 136 wherein the value for the contract includes a price for the contract.

140. The system of claim 136 wherein the value for the contract includes odds that the at least one future characteristic of the financial market will satisfy the one or more parameters.

141. The system of claim 136 wherein the value for the contract includes a payout for the contract.

142. The system of claim 136 wherein the value reflects an implied volatility of the financial market.

143. The system of claim 136 wherein the contract must be purchased within a period of time.

144. The system of claim 136 wherein the one or more parameters includes a desired payout amount.

145. The system of claim 136 wherein the one or more parameters includes a target for the at least one future characteristic of the financial market.

146. The system of claim 136 wherein the one or more parameters includes a barrier for the at least one future characteristic of the financial market.

147. The system of claim 136 wherein the financial market includes a foreign currency market and the one or more parameters includes a currency exchange rate.

148. The system of claim 136 wherein the financial market includes a stock market and the one or more parameters includes a stock price.

149. The system of claim 136 wherein the financial market includes a stock market index and the one or more parameters includes a stock market index price.

150. The system of claim 136 wherein the financial market includes a commodity market and the one or more parameters includes a commodity price.

151. The system of claim 136 wherein the financial market includes a foreign currency market and the at least one future characteristic of the financial market includes a change in a foreign currency exchange rate.

152. The system of claim 136 wherein the financial market includes a stock market and the at least one future characteristic of the financial market includes a change in a stock price.

153. The system of claim 136 wherein the financial market includes a stock market index and the at least one future characteristic of the financial market includes a change in a stock market index price.

154. The system of claim 136 wherein the financial market includes a commodity market and the at least one future characteristic of the financial market includes a change in a commodity price.

155. The system of claim 136 wherein the one or more parameters includes a first financial market and a second financial market and the at least one future characteristic of the first financial market includes a first target for the first financial market and the at least one future characteristic of the second financial market includes a second target for the second financial market.

156. The system of claim 136 wherein the data concerning the financial market includes real-time market data.

157. The system of claim 136 wherein the data concerning the financial market includes historical market data.

* * * * *

UNITED STATES PATENT AND TRADEMARK OFFICE
CERTIFICATE OF CORRECTION

PATENT NO. : 8,046,293 B2
APPLICATION NO. : 11/734734
DATED : October 25, 2011
INVENTOR(S) : Jean-Yves Sireau It is certified that error appears in the above-identified patent and that said Letters Patent is hereby corrected as shown below:

In column 2, line 33, replace "her" with --more other--.

In column 4, line 17, replace "15" with --1--.

In column 8, line 37, replace the equation with -- $N(x) = \int_{-\infty}^{x} f(y)dy$ --.

In column 8, line 39, replace "al" with --the initial--.

In column 19, line 2, replace "he" with --be--.

Signed and Sealed this
Twenty-fifth Day of September, 2012

David J. Kappos
*Director of the United States Patent and Trademark Office*